April 28, 1970  E. OSPINA-RACINES  3,508,415
NATURAL GAS TRANSMISSION POWER CYCLE
Filed April 23, 1968  2 Sheets-Sheet 1
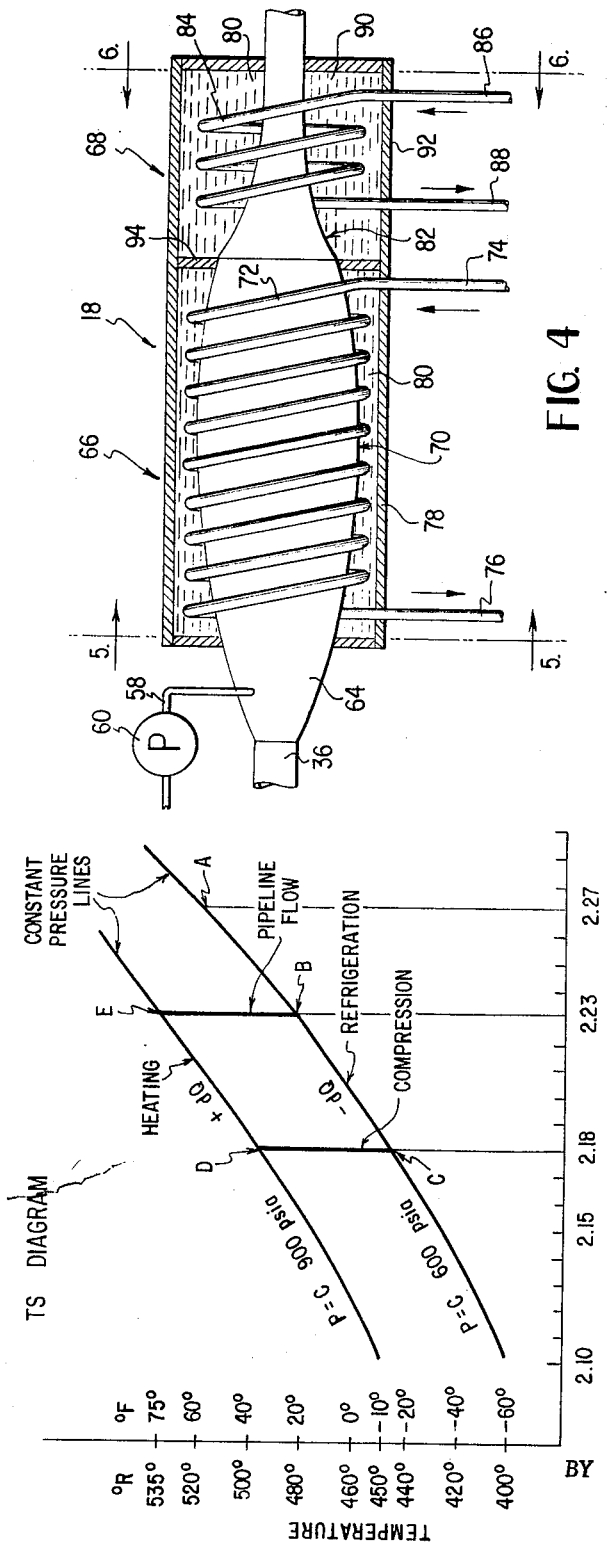
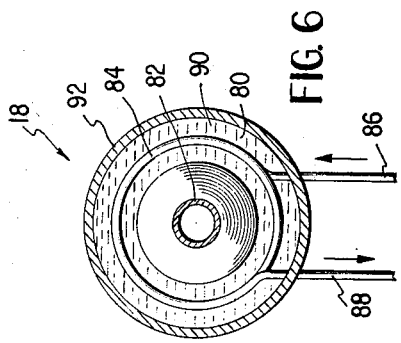
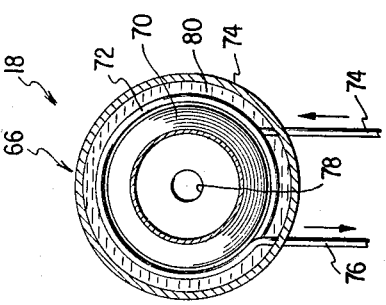
INVENTOR
EDUARDO OSPINA-RACINES
ATTORNEYS.

April 28, 1970  E. OSPINA-RACINES  3,508,415
NATURAL GAS TRANSMISSION POWER CYCLE
Filed April 23, 1968  2 Sheets-Sheet 2

INVENTOR
EDUARDO OSPINA-RACINES

BY *Colton + Stone*

ATTORNEYS.

United States Patent Office 3,508,415
Patented Apr. 28, 1970

3,508,415
NATURAL GAS TRANSMISSION POWER CYCLE
Eduardo Ospina-Racines, Apartado Aereo 49-45,
Bogota, Colombia
Filed Apr. 23, 1968, Ser. No. 723,545
Int. Cl. F17c 7/02
U.S. Cl. 62—52       8 Claims

ABSTRACT OF THE DISCLOSURE

The conventional gas transmission system and processes which comprise periodic compression of the gas stream followed by expansion of the gas in the pipeline is modified to include cooling the gas stream prior to compression and heating the gas stream after compression. By this modification a reversible power cycle is established at the compressor station which comprises four thermodynamic processes, namely heat rejection at constant pressure, compression of the gas, heat addition at constant pressure, gas expansion in the pipeline. By this modification the enthalpy of the gas is increased notably at the point of delivery into the pipeline, with the same compression ratio for the compression process. As a result of the increased energy imparted to the gas thereby, a greater volume of gas can be flowed in the same diameter pipeline or a smaller diameter pipe may be installed for a given volume flow, likewise the distance between compressor stations may be increased or combinations thereof with great technical and economic advantage over the conventional gas compressor system.

BACKGROUND OF THE INVENTION

This invention relates to an improved gas pipeline transmission system in which the flow process in the pipeline and the compression of the gas are complemented with a heat rejection process and a heat addition process thereby establishing a reversible power cycle. The gas being transported from one power station to the subsequent one, which may be natural gas comprising hydrocarbons as a major component thereof, is used as the working fluid of the cycle. The power cycle of this invention is comparable to other well-known power cycles described in thermodynamics texts and known as the Diesel, Otto, Rankine cycles.

Commercial natural gas comprises predominantly methane, usually in excess of 90% by volume, with small amounts of additional gaseous phase hydrocarbons and some impurities such as carbon dioxide and water. The physical properties of natural gas may be found in the literature in such publications as Engineering Data Book published by the Natural Gasoline Supplymen's Association of Tulsa, Okla., and Thermodynamic Properties and Reduced Correlations by L. N. Canjar et al., published by Gulf Publishing Company of Houston, Tex.

Present natural gas pipeline transmission systems utilize two flow processes. The first is accomplished by performing work on the gas and compressing it from a low pressure to a higher pressure. The second process is the flow of the high pressure gas through the pipeline, and the consequent reduction in pressure thereof, to a second compressor station at a remote location. As an example, conventional compressor stations are conventionally designed for a 600 p.s.i.a. inlet pressure and a 900 p.s.i.a. discharge pressure so that the compression ratio (outlet absolute pressure/inlet absolute pressure) is in the neighborhood of 1.5. The distance between successive compressor stations is also a variable in the design of a gas pipeline system and are conventionally found about 50 to 80 miles apart. The aforementioned process utilized in conventional pipeline transmission systems are isolated or separated from each other in the sense that only one process is active on a given volume of gas at any one time. These two processes are assumed for design purposes to be adiabatic by which is meant that no heat is added or removed. This assumption is not totally correct since there is some heat transferred between the gas stream and the surrounding environment although this factor is negligible and may be disregarded without serious error.

The quantity of gas that can be made to flow through a pipeline from one compressor station to the subsequent one is a function of the internal diameter of the pipe, of the inlet and outlet absolute pressures of the density of the gas, of its viscosity, of the average deviation factor (a measure of the difference between the actual gas involved and a perfect gas) of the distance between compressor stations, of the flowing temperature of the gas. The corresponding flow equations in natural gas transmission may be found in handbooks such as Engineering Data Book, published by Natural Gasoline Supply Men's Association of Tulsa, Okla., and others. It should be pointed out that the inlet pressure at the compressor station corresjonds to the outlet pressure of the preceding compressor station, diminished by the pressure drop experienced in the flow of the gas in the pipeline between compressor stations.

A study of the gas flow equation to see which of the parameters can be modified to increase the capacity of the pipeline reveals that the inlet and outlet pressures may be taken as fixed because the compression ratio is normally a fixed value because of economic factors. Accordingly the only parameters that are modified by present pipeline engineer designers are: the internal diameter of the pipe, the looping of the line, by laying a parallel pipeline along the existing line and by varying the distance between compressor stations.

As will be apparent to those skilled in the art, the conventional natural gas transmission system wherein only two adiabatic processes are used, has numerous limitations and very little flexibility. However, by establishing a reversible power cycle at the compressor stations, according to this invention, the limitations and the inflexibility of present design of gas transmission systems are overcome with great technical and economic advantage.

SUMMARY

The gas transmission system of this invention includes cooling the incoming gas below the temperature at which compression is normally begun and then compressing the gas. The cooling process is preferably conducted at substantially constant pressure. After the compression of the gas has been completed, the gas is heated at substantially constant pressure prior to the delivery thereof into the pipeline system. By utilizing a heat rejection process and a heat addition process in conjunction with the present compression and pipeline expansion processes considerable flexibility is added to the design and operation of a gas transmission system, not possible to attain by conventional compressor systems.

In countries in the northern latitudes the peak periods of gas flow through transcontinental pipelines is during the winter months. With the proposed system of gas transmission which utilizes a refrigeration process on the incoming gas, which in turn permits a greater flow gas in the same diameter pipe, it is possible to make use of environmental refrigeration at great economic advantage by exposing the pipeline coming into the compressor station to the environment and chilling the gas without the power refrigeration operation. Since the amount of gas which can be flowed with this improved system is a function of the amount of refrigeration developed at the compressor station the use of environmental refrigeration is a means of attending to peak gas demand in winter months with great economic advantage. In gas transmission systems which produce and store LNG (liquid natural gas, which is essentially methane) peak demand is attended by vaporizing the LNG. In this peak demand supply operation the stored LNG may be utilized to refrigerate the incoming gas with great economic advantage. The use of refrigeration from other than the power refrigeration unit at the compressor station is a feature of the invention.

It is an object of this invention to provide a gas transmission system wherein the compression step is preceded by chilling the gas below the normal inlet temperature.

Another object of the invention is to provide a gas transmission system and processes wherein a power cycle is established at the compressor station.

A more specific object of the invention is to provide a gas transmission system and processes wherein the gas is received from the pipeline, cooled at constant pressure, adiabatically compressed to an elevated pressure, heated at constant pressure and then delivered into the pipeline for flow to a subsequent compressor station.

BRIEF DESCRIPTION OF THE DRAWINGS

FIGURE 1 is a temperature-entropy diagram illustrating the power cycle of this invention;

FIGURE 4 is an enlarged view, partly in section, of the means utilized to heat the gas at constant pressure;

FIGURE 5 is a cross-sectional view of the heating mechanism of FIGURE 4 taken substantially along line 5—5 thereof as viewed in the direction indicated by the arrow; and FIGURE 6 is a cross-sectional view of the heating mechanism of FIGURE 4 taken substantially along line 6—6 thereof in the direction of the arrows.

DESCRIPTION OF THE PREFERRED EMBODIMENT

Figures 2, 3:
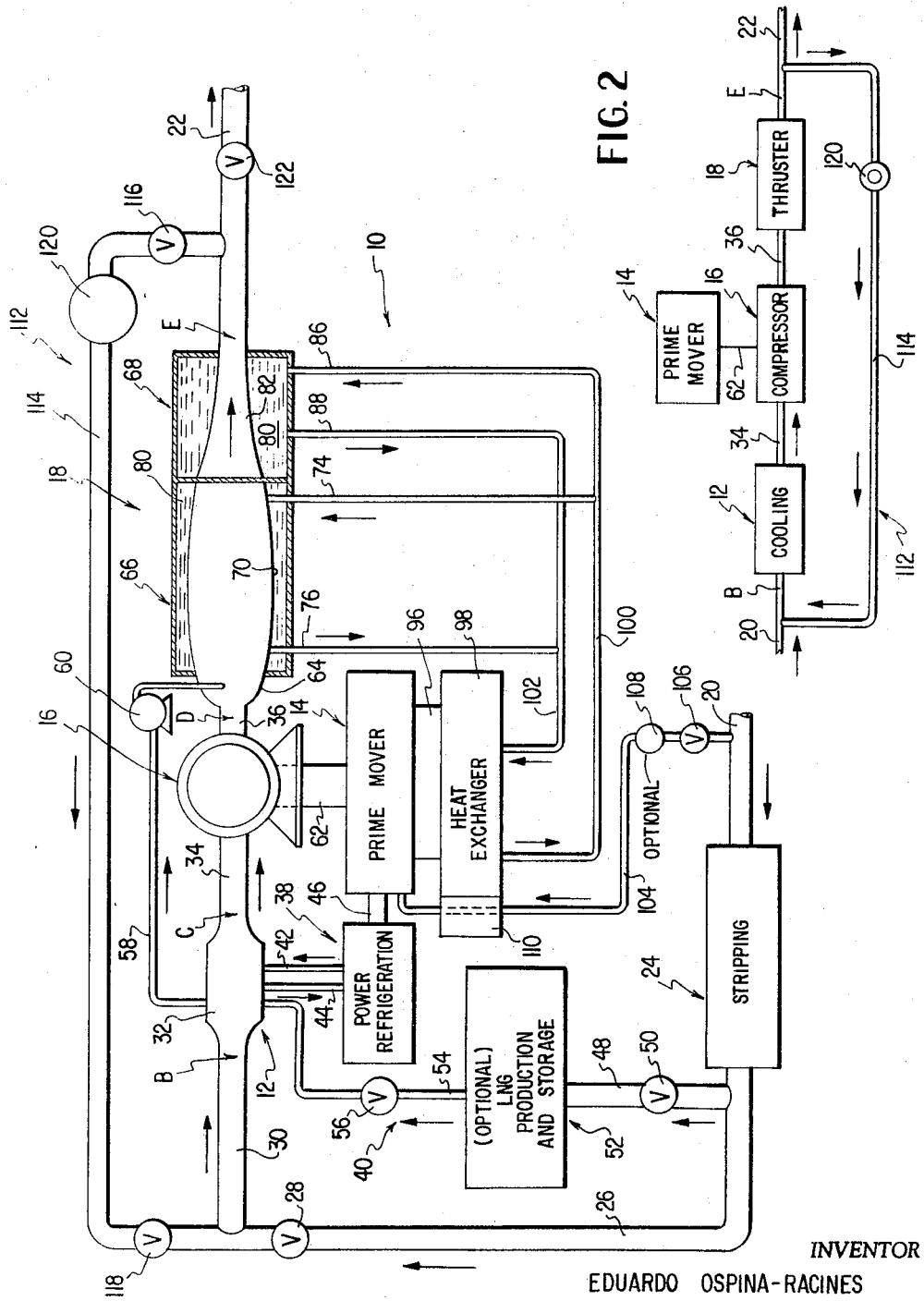
FIGURE 2 is a simplified schematic of a power station constructed in accordance with this invention.
FIGURE 3 is a schematic view of an exemplary power station constructed in accordance with the principles of this invention.

Attention is now directed to FIGURE 1 wherein the four thermodynamic processes of this invention are illustrated utilizing a common natural gas and exemplary temperatures and pressures. The cycle of this invention starts along the 600 p.s.i.a. isobar at point B. The first step is to cool the gas at constant pressure until the characteristics of the system are represented by point C. The second step in the process is to adiabatically compress the natural gas along line C–D followed by the heating step at constant pressure along line D–E. The gas is then delivered into the pipeline where adiabatic expansion occurs along line E–B.

As previously noted the two processes now used in gas transmission systems are the compression step along line C–D and the expansion step along line E–B. The energy equation for a steady flow system may be reduced to $dh = -dw$ which means that energy input into the pipeline flow process equals the work performed on the gas by the compressor. All of the limitations of the present pipeline gas flow are contained in this expression. By linking the two adiabatic processes with a constant pressure heat rejection step and a constant pressure heat addition step, the energy equation for steady flow becomes $dh + dv^2/2Jg = dq - dw$ wherein in $dh$ is the change of enthalpy of the gas entering the compressor station and exiting the compressor station; $dv^2/2Jg$ is the kinetic energy added by heat addition made possible by previously refrigerating the gas; $dq$ is the heat added during the heating step and $-dw$ is the work performed on the gas by the compressor and by the cooling operation. This equation reveals the great flexibility in establishing a power cycle in gas pipeline transmission and by utilizing the gas as the working fluid in the processes. Since this constitutes a power cycle, greater flow of gas in a given system may be obtained by greater refrigeration and greater corresponding heat addition in that the heat addition may be varied as a function of the work done on the gas.

To give an illustrative example, representative thermorynamic properties of methane are used below in a gas pipeline transmission system flowing 500 MM c.f.d. (million cubic feet of gas per day as measured at standard pressure and temperature). The inlet pressure is assumed to be 600 p.s.i.a. at the compressor station and the outlet pressure is assumed to be 900 p.s.i.a. at the outlet thereof. The pipeline is assumed to be a 30-inch internal diameter tubular conduit.

Cooling process on 600 p.s.i.a. isobar along line A–B

The incoming gas is first received at point A where the physical characteristics of the gas are as follows: pressure 600 p.s.i.a., temperature 60° F., $h$ or enthalpy −1552.6 B.t.u./lb., S or entropy 2.272 B.t.u./lb./° R., specific volume .5356 cu. ft./lb. The gas is chilled by suitable means along the 600 p.s.i.a. isobar until the system reaches point B where the physical characteristics of the gas are as follows: pressure 600 p.s.i.a., temperature 20° F., enthalpy −1557 B.t.u./lb., entropy 2.23 B.t.u./lb./° R. Since this A to B cooling process may occur only at the first compressor station of a transmission system it does not constitute a part of the power cycle but instead acts to condition the power fluid for operation in the cycle.

Cooling process on 600 p.s.i.a. isobar along line B–C

Cooling of the gas stream from point B to C may be accomplished through the use of a separate cooling installation such as low temperature environment during cold weather, LNG, or by the continued use of the process effecting cooling from point A to B. The cooling step from point B to C is separated from the cooling step from A to B since the latter step is necessary only once in a transmission system whereas the former is preferably repeated at each compressor station. The physical characteristics of the gas at point C are as follows: pressure 600 p.s.i.a., temperature −10° F., enthalpy −1595.5 B.t.u./lb., entropy 2.18 B.t.u./lb./° R., specific volume .45.

Adiabatic compression step along line C–D

The absolute pressure of the gas is increased from 600 p.s.i.a. to 900 p.s.i.a. hereby giving a 1.5 compression ratio which is optimal for present equipment. The enthalpy at the compressor discharge is increased to −1575.8 with gas temperature being 40° F.; S being 2.18 and specific volume being .33. The enthalpy of the gas is increased by 19.7 B.t.u./lb.

Under present practice the gas is delivered into the pipeline inlet without, of course, having been subject to the previous cooling step. By lowering the compressor inlet temperature to −10° F. in accordance with this invention, less work is required during the compression step since the work done during compression is a function of absolute temperature. One skilled in the art may calculate that 10,500 HP is required to compress 500 MM c.f.d. at a compression ratio of 1.5 and an inlet temperature of 60° F. With the −10° F. inlet temperature only 9083 HP is required leaving a savings of 1417 HP.

In the event that excess refrigeration capacity is available to perform or aid in the cooling step, it will be apparent that the horsepower savings may be used to increase the compression ratio and the quantity of gas flow. Alternatively, it will be apparent that a smaller compressor will accomplish this same task by using the processes of this invention.

Heating at 900 p.s.i.a. along line C–D

During heating of the gas on the 900 p.s.i.a. isobar, the temperature is increased to 75° F., the enthalpy is increased to −1552.7 and S is increased to 2.23. As will be explained hereinafter, a thrust producing device, similar to a ramjet or gas turbine is used to increase the kinetic energy of the gas as a function of the heat added and the higher temperature of the gas. Utilizing such a device adds 23.1 B.t.u./lb. to the enthalpy of the gas. Thus the total heat energy added to the gas by the compression step and the heating step constitutes 42.8 B.t.u./lb. which may be converted into work which is the flow of gas through the pipeline.

Adiabatic expansion along line E–B

During this step of the power cycle, the net energy added to the gas during the previous steps is used to propel the gas through the pipeline. The gas expands adiabatically in the pipeline and reaches the subsequent compressor station at 600 p.s.i.a., $T=20°$ F., $S=2.23$ B.t.u./lb./° R., $H=-1577$ B.t.u./lb. where the steps of isobaric cooling, isoentropic compression, and isobaric heating may be repeated. The refrigeration process along line B–C is comparable to the condenser used in the steam Rankine cycle and is a factor obtaining maximum thermal efficiency in the power process which is the gas flow in the pipeline along line E–B. This power process observes the principle stated by Carnot that the conversion of heat into work should employ a maximum temperature upon initiating the process and the lowest possible temperature referred to as the sink temperature at the end of the process. In this case these are 75° F. and −10° F. which gives a Carnot efficiency of 15.9% which is not attained by present compressor practice because it is not a reversible power cycle but an isolated highly inefficient adiabatic process. In the practice of the present invention, the compression ratio may remain fixed while the increase of enthalpy at point E allows greater flow capacity, smaller diameter pipe, longer distance between compressor stations or combinations thereof.

While the temperature and pressure conditions for the flow process along line E–B remain fixed, the operation of the remaining three processes of the power cycle may be varied to advantage. For example, given a centrifugal compressor operated by a 10,500 HP gas turbine, flow through the compressor may be increased from the 500 MM c.f.d. by reducing the compression ratio. With a lower compression ratio, greater refrigeration is required so that the compressor inlet temperature is lower than −10° F. In this event greater heat addition must take place so that the pipeline inlet temperature remains at 75° F. Given a constant compression ratio, the heat rejection and heat addition steps may be varied for greater or lesser amounts of gas flow. [Likewise inlet temperature into the pipeline at point E may be increased say to 100° F. and obtain a higher one at point B to control the heat flow to and from the ground to the pipeline.] (Great flexibility is therefore present to operate a compressor station for a given gas flow not possible under present practice.)

Referring now to FIG. 2 wherein a simplified power station 10 is illustrated for performing the aforementioned processes. The power station 10 comprises as major components a cooling means 12 a prime mover 14 driving a compressor 16 which is in gas receiving relation with the cooling means 12 and thruster 18 in gas receiving relation with the compressor 16, conduit 112 and power absorber 120 to permit bypassing the pipeline for testing or other purposes. The power station 10 comprises an inlet conduit 20 providing communication between the cooling means 12 and the preceding pipeline segment and an outlet conduit 22 providing communication between the thruster 18 and the next succeeding pipeline segment. It will be apparent that the cooling step along line B–C of FIGURE 1 occurs in the cooling means 12, the compression step C–D occurs in the compressor 16 and the heating step D–E occurs in the thrust producing device or thruster 18. The flow process E–B can occur in the pipeline or it may be bypassed by conduit 112 and the power absorber 120 at the station proper. The cooling step along line A–B–C may occur in the cooling means 12 or elsewhere such as an atmospheric sink heat exchanger in northern latitudes during cold weather, or by utilizing stored LNG available.

Referring now to FIGURES 3, 4, 5 and 6 a more complete illustration of the power station 10 is shown. The inlet conduit 20 is in communication with a purification means 24 which may include means for removing moisture, hydrogen sulfide, carbon dioxide, liquifiable hydrocarbons and the like. A conduit 26 exists from the purification means 24 to a valve 28 which is in communication with a conduit 30 leading to a heat exchanger 32. The heat exchanger 32 is in communication with the compressor 16 through a conduit 34. The compressor 16 exhausts into conduit 36 in communication with the thruster 18 as described in FIGURES 4, 5, 6.

The cooling means 12 may be of any suitable type, including environmental cooling, but is illustrated as comprising alternative or supplementary power refrigeration means 38 and LNG, liquid natural gas cooling means 40. The power refrigeration means 38 comprises a suitable compressor, condenser, expansion nozzle and suitable controls therefore with the heat exchanger 32 constituting the expander. The refrigerant material passes through a conduit 42 from the power refrigeration means 38 to the heat exchanger 32 and returns through a similar conduit 44. The compressor of the power refrigeration means 38 is driven by the prime mover 14 as indicated by a power transmitter 46.

The liquid natural gas cooling means 40 LNG which is optional is advantageously used in a peak shaving program whereby natural gas is liquefied during period of minimal demand and stored. During periods of peak demand, the previously liquefied and stored natural gas is reinjected into the pipeline system to accommodate maximum demand. During the reinjection of the liquefied natural gas into the pipeline system, considerable refrigerating capability is available to cool the gas stream passing through the power station 10.

The liquefied natural gas cooling means 40 comprises a conduit 48 having a valve 50 therein in communication with the conduit 26. Suitable liquefying and storing means 52 utilizing a Joule-Thomson or Claude cycle or other process is utilized to reduce the natural gas to a liquid condition. The use of LNG is optional and is only one aspect of the refrigeration process of the power cycle. An outlet conduit 54 leads from the liquefying and storing means 52 to the heat exchanger 32 and includes a valve 56 therein. Since liquid natural gas vaporizes at −259° F. at atmospheric pressure, it will be apparent that considerable chilling of the flowing gas stream may be accomplished in the heat exchanger 32. A conduit 58 exits from the heat exchanger 32 for injecting the liquefied natural gas into the gas stream. Since the liquid natural gas cooling means 40 is designed to deliver 900 p.s.i.a fluid material to the vaporizer at the discharge end of the compressor 16, a LNG pump 60 is illustrated to facilitate injection of the LNG used as coolant material.

It should be apparent that the interior configuration of the heat exchanger 32 may be constructed to handle liquefied natural gas, the refrigerant material from the power refrigeration means 38 or a combination thereof.

The compressor 16 may be of any suitable configuration but is preferably of the centrifugal type since much flexibility is gained thereby and since the prime mover 14 may be a gas turbine operatively associated with the compressor 14 through a power transmission mechanism 62. The compressor outlet conduit 36 is in fluid communication with a diffuser 64 immediately upstream of the thrust producing device 64, 70, 82, or thruster 18. A gas turbine prime mover is advantageously used in the compressor station 10 since a large quantity of heat is available therefrom for operation of the thruster 18.

The thruster 18 is a thrust producing device whose design is that of a ram jet or jet gas generator engine. This device permits carrying out the heat addition process at constant pressure and is a feature of the invention. The thruster 18 is described in detail in FIG. 4, FIG. 5 and FIG. 6. The thruster comprises two sections. The inner section is the flow conduit made up by the diffuser 64 the energizer 70 and the nozzle 82 which make up part of the pipeline flow system located between the discharge outlet of the compressor and the inlet of the pipeline. Ram jets or gas turbine power units have these three conduits in the same flow relation. The outside section of the thruster 18 comprises a cylindrical shell 66 and 68 which can be larger diameter pipe. The annulus created between these two cylindrical conduits is filled with heat transfer fluid, such as mineral oil or water 80 of FIGS. 4, 5 and 6.

The heat transfer fluid is heated up by hot water flowing in the helically wrapped coil 72 having an inlet 86 and 74 and an outlet 88 and 76 conduit connection with the waste heat boiler 98 receiving heat in the exchanger 98 from the exhaust hot gases of the prime mover, which should be preferably a gas turbine jet engine. This heat transfer section has for its purposes to heat up the gas flowing in the thruster section made up of the diffuser 64 energizer 70 and nozzle 82 described above. The heat added in this section increases the enthalpy of the gas issuing from the outlet of the compressor and thereby increases the kinetic energy of the gas issuing from the nozzle 82. This process develops at the higher pressure of 900 p.s.i.a. and relatively low temperature, the latter having increased from 40° F. to 75° F. In ram jet or gas turbine jet engines this flow process develops at atmospheric pressure of the environment and relatively high temperatures, of the order of between 2000° F. and 4000° F. In both instances the gases which are heated thereby increase in kinetic energy and produce a thrust. In the illustrative case the ethalpy of the natural gas incoming at point C of FIG. 1 amounts to −1595.5 which the compressor increases to −1575.8 or +19.7 B.t.u./lb. by the compression process at point D of FIG. 1. The thruster 18 receives this gas at 40° F. which is heated up in the energizer 70 to 75° F. and maintained at this temperature while the gas flows in the nozzle 82 in compartment 92, and into the pipeline. The energizer 70 has increased the enthalpy of the gas to −1552.7 B.t.u./lb. of 23.1 B.t.u./lb. for this heat addition process, developed at high pressure of 900 p.s.i.a. and relatively low temperatures from 40° F. to 75° F.

From the description of the operation of the compressor and the thruster it is concluded that by utilizing the thrust producing device in the heat addition process the waste heat from the prime mover has been harnessed which increases the thermal efficiency of the system and increases the enthalpy or energy of the gas at the inlet of the pipeline. This energy increase amounted to 19.7 B.t.u./lb. by the compression process and 23.1 B.t.u./lb. by the heating in the thruster 18 for an overall increase of 42.8 B.t.u./lb. yet increasing the pressure of the gas only 1.5 times from 600 to 900 p.s.i.a. While such enthalpy increase could be developed solely by compression of the gas from 600 to possibly 1300 p.s.i.a. operating costs go up geometrically and a high pressure pipe would be required and the conventional compressor process would still prevail which is highly inefficient, compared to the power cycle, object of the invention.

It will be seen therefore that the heat energy added in the energizer 70 increases the enthalpy of the gas by the most efficient means thermodynamically. Since the ability to do work is measured in the difference of the enthalpy values between points E and C of the Ts diagram of FIG. 1 which in this case is the movement of the gas working fluid from one station to the subsequent one by utilizing a power cycle a greater quantity of gas may be made to flow in the same diameter pipeline or the distance between stations may be increased or for a given volume flow a smaller pipe diameter may be utilized all of which bring about great technical and economic benefits in the transmission of gas.

The energizer shell 70 is in heat exchange relation with a helically wrapped conduit 72 having inlet and outlet conduits 74, 76 arranged for countercurrent heat exchange. The energizer shell 70 which corresponds to the combustor of the gas generating jet engine the temperatures range from 2000° to 4000° F. and the pressure is of the atmospheric environment. The principle of producing a thrust by heat addition is essentially the same and is a feature of the invention.

The thruster 18 includes therefore the entire mechanism as described in FIGURES 4, 5 and 6 and comprises the outer shell 66, 68, 78, the diffuser 64, the energizer 70, nozzle 82 which make up the conduit for the flow of the gas between the compressor 16 and the inlet into the pipeline 22. The heating system of the thruster includes a helically wrapped conduit 84, 72 having inlet and outlet conduits 86, 74; 88, 76 arranged for countercurrent heat exchange, for heating heat transfer fluid 80 which in turn heats up the nozzle shell 82, 70 to maintain the outgoing temperature of the gas at 75° F. which is the inlet temperature of the gas into the pipeline.

The energizer shell 70 receives heat from the waste heat boiler through conduits 74, 76 which circulate hot water or other fluid and heat up the heat transfer fluid 80. These conduits connect with the helically wrapped coil around shell 70.

The heat source utilized to operate the thruster 18 is provided by the exhaust gases from the prime mover 14. One of the characteristics of the preferred gas turbine is a copious discharge of high temperature exhaust gas. To utilize this waste heat, a suitable conduit 96 is provided to deliver the exhaust gases to a waste heat boiler 98 wherein a suitable working fluid, such as water or the like is heated. High temperature fluid such as water is delivered through an outlet conduit 100 to the inlet conduits 74, 86 of the energizer and nozzle sections 66, 68. The exhaust conduits 76, 88 of the energizer and nozzle sections 66, 68 deliver relatively cool working fluid to an inlet conduit 102 leading to the waste heat boiler 98. It will accordingly be seen that hot water generated by the waste heat boiler 98 is delivered to the energizer and nozzle sections 66, 68 to heat the gas stream flowing through the energizer and nozzle shells 70, 82. This heating system is comparable to the combustor in a ram jet or gas turbine engine but of low temperature operation.

A fuel line 104 is provided between the inlet conduit 20 and the prime mover 14 to deliver fuel thereto. A valve 106 and a regulating mechanism 108 are provided in the fuel line 104 to control fuel flow. The regulating mechanism 108 may comprise a gas expander and power absorber to recover the energy of the gas used as fuel. In the illustrative example wherein the prime mover 14 is a 10,500 HP gas turbine, some 2 million cubic feet of gas are used per day. Since the inlet pressure in conduit 20 is 600 p.s.i.a. and the fuel is accepted by the turbine at 70 p.s.i.a., the expansion of 2 million cubic feet per day between these pressures can obtain a maximum of 70 kilowatts of electricity with conventional equipment. This operation is entirely optional and it is not an essential feature of the invention.

Since the gas emitting from the regulating mechanism 108 is quite cold, the fuel line 104 is illustrated as passing through a heat exchanger 110 in communication with the waste heat boiler 98 to heat the fuel to improve thermal efficiency of the prime mover 14.

In the event that its is desirable or advantageous to continuously or periodically develop additional electrical energy or for testing to reach equilibrium flow conditions or other power at the station 10, bypass means 112 comprising a conduit 114, suitable valves 116, 118 and a gas expander and power absorber 120 is provided. By manipulation of the valves 116, 118 the gas issuing from the thruster 18 nozzle 82 may be partially diverted from the pipeline inlet 22 and delivered through the gas expander and power absorber 120 to develop the desired energy on a continuous basis. The gas flowing through the bypass means 112 is delivered through the valve 118 into the conduit 30 leading to the heat exchanger 32. In the event that the total output of the power station 10 is required to be developed by the gas expander and power absorber 120, a valve 122 is positioned in the outlet conduit 22. By closing the valve 122 and opening the valves 116, 118 it will be seen that the total energy may be developed through the gas expander and power absorber 120.

It will also be seen that the closing of the valves 28, 50, 106, 122 acts to separate the power station 10 from the upstream and the downstream segments of the pipeline system in the event that flow must be stopped or for testing purposes.

SUMMARY OF OPERATION

For purposes of simplicity, it is assumed that the illustrated power station 10 is an intermediate station in the pipeline system so that gas received at the inlet conduit 20 has the characteristics at point B of FIGURE 1. In accordance with the example set forth previously, the incoming gas is received at 600 p.s.i.a. and 60° F. The gas is stripped of impurities at the purification means 24 and lean gas is delivered through the conduit 26 to the inlet of the heat exchanger 32. Since there has been no substantial change in the properties of the gas in flowing from the inlet conduit 20 to the inlet of the heat exchanger 32, the thermodynamic properties of the gas are substantially unchanged. The power refrigeration means 38 and/or the liquid natural gas cooling means 40 establish the lower temperature in the heat exchanger 32 which chills the lean gas to a temperature of $-10°$ F. The gas enters the suction of the compressor 16 which exhausts at 900 p.s.i.a and 40° F. The gas flows into the thruster FIG. 4 where heat addition takes place by virtue of hot water circulation in conjunction with the waste heat boiler 98. The gas is heated from 40° F. to 75° F. which constitutes a temperature increase of 35° F. Since natural gas has a specific heat in the neighborhood of .5, only 17.5 B.t.u. per pound is required at 100% thermal efficiency at the thruster 18. For the 500 MM c.f.d. flow rate, which equals $10^6$ pounds per hour, the heat requirements of the thruster FIG. 4 amount to $17.5 \times 10^6$ B.t.u. per hour at 100% efficiency. Even considering that the thermal efficiency in the waste heat boiler 98, the conduits 100, 102 and the thruster 18 is substantially less than 100%, the gas turbine develops sufficient waste heat to meet this need.

As a result of compounding present transmission processes of adiabatic compression and expansion with the heat rejection and heat addition steps of this invention to establish a power cycle at each compressor station, many of the parameters of the gas transmission flow equation can be varied for utmost efficiency. A preliminary analysis of the flow equation with the values given in the example above indicates that by refrigerating the incoming gas to $-10°$ F. and delivering it to a pipeline at 75° F., the quantity of gas that will flow in a given diameter pipeline of 30", a compressor ratio of 1.5 and at the same station spacing of 81 miles, the capacity of the pipeline will increase from 500 MM c.f.d. to 750 MM c.f.d. The reason for increased flow capacity through the pipeline is that kinetic energy has been added to the gas stream by the thruster FIG. 4. Since the flow capacity of a tubular pipe in a conventional gas transmission system is a function of the internal pipe diameter threof, if all other factors are constant, it may be readily calculated that an additional 250 MM c.f.d. capacity would require the looping of the 30" pipeline which means installing a parallel conduit of 22" diameter. With this improved system of gas transmission the additional 250 MM c.f.d. can be made to flow in the same 30" pipeline which obviously is a great economic advantage over the current compressor system.

It will accordingly be seen that the flow capacity of a pipeline can be increased substantially by incorporating at the compressor station the heat rejection and the heat addition processes. In designing a pipeline for a given volume flow the benefits include the use of a smaller pipe diameter and greater efficiency.

While this invention has been described in terms of a specific embodiment, the scope of the invention is not limited thereto but is defined by the appended claims.

I claim:

1. A hydrocarbon gas transmission system which developes four thermodynamic processes thereby constituting a reversible power cycle with the natural hydrocarbon gas being transported acting as the working fluid of the cycle, comprising an inlet conduit, a purification system, a refrigeraton system to cool the gas below 60° F. standard ambient temperature, a prime mover driven compressor to increase the pressure of the gas, a thrust producing device wherein the gas is heated by hot exhaust gases from the prime mover, said device comprising a diffuser, an energizing shell which receives heat conveyed by heat transfer fluid from a waste heat boiler of the prime mover, a nozzle and an outlet conduit which delivers the gas into a transmission conduit for adiabatic expansion therein, means for bypassing said transmission conduit at the compressor by flowing the high pressure gas through an expander and power adsorber mechanism to a lower pressure and lower temperature, delivering said low pressure gas to the inlet conduit, thereby developing the four thermodynamic processes at the compressor to permit developing equilibrium conditions of the power cycle.

2. In a pipeline transmission system according to claim 1 wherein the thrust producing device conforms to the configuration of a ram jet wherein the gas flowing in the diffuser, energizing shell and nozzle is heated by heat conveyed from the waste heat boiler around the energizing shell and nozzle shell of said device which are immersed in a heat transfer fluid contained in a larger cylindrical shell, said heat transfer fluid in heat exchange with the energizing and nozzle shell of the thrust producing device for the purpose of increasing the enthalpy of the gas at constant pressure prior to delivering said gas into the transmission conduit and have it expand adiabatically therein.

3. In a system for transporting gas through conduit means wherein the gas is received at succesive spaced apart compressor stations at a relatively low inlet pressure and inlet temperature, pressurized to a relatively high outlet pressure and temperature and then redelivered to the conduit means for adiabatic expansion therein, the improvement comprising means for cooling the gas below the inlet temperature prior to compression thereof and means for heating the gas after compression thereof and prior to redelivery thereof to the conduit means, the heating means comprising means for imparting thrust to the gas.

4. The system of claim 3 wherein the thrust producing means comprises means for heating the gas at substantially constant pressure.

5. The system of claim 3 wherein the cooling means comprises means for cooling the gas below atmospheric temperature.

6. The system of claim 3 wherein the gas comprises methane and the heating means comprises means for noncombustively heating the gas.

7. A method of transporting a gas in a pipe line system having spaced apart compressor stations connected by conduit means, the gas being received at the compressor stations at a relatively low inlet pressure and inlet temperature, pressurized to a relatively high outlet pressure and temperature and then redelivered to the conduit means for adiabatic expansion there, the improvement comprising cooling the gas below the inlet temperature prior to compression thereof and increasing the kinetic energy of the gas by noncombustive heating thereof after compression.

8. The method of claim 7 wherein the gas comprises a major portion of methane.

References Cited

UNITED STATES PATENTS

| | | | |
|---|---|---|---|
| 2,535,148 | 12/1950 | Martin et al. | 62—52 X |
| 2,958,205 | 11/1960 | McConkey | 62—55 X |
| 3,438,216 | 4/1969 | Smith | 62—52 |

LLOYD L. KING, Primary Examiner

U.S. Cl. X.R.

62—55

UNITED STATES PATENT OFFICE
CERTIFICATE OF CORRECTION

Patent No. 3,508,415  Dated April 28, 1970

Inventor(s) Eduardo Ospina-Racines

It is certified that error appears in the above-identified patent and that said Letters Patent are hereby corrected as shown below:

Column 1, line 71, "process" should be --processes--.

Column 2, lines 23-24, "corresjonds" should be --corresponds--.

Column 6, line 35, "period" should be --periods--.

Column 10, line 2, "threof" should be --thereof--.

Claim 7, line 9, "there" should be --therein--.

SIGNED AND SEALED
AUG 25 1970

(SEAL)
Attest:

Edward M. Fletcher, Jr.
Attesting Officer

WILLIAM E. SCHUYLER, JR.
Commissioner of Patents